Jan. 10, 1950     D. M. LIGHT     2,494,300
FRICTION DEVICE
Filed June 4, 1945     2 Sheets-Sheet 1
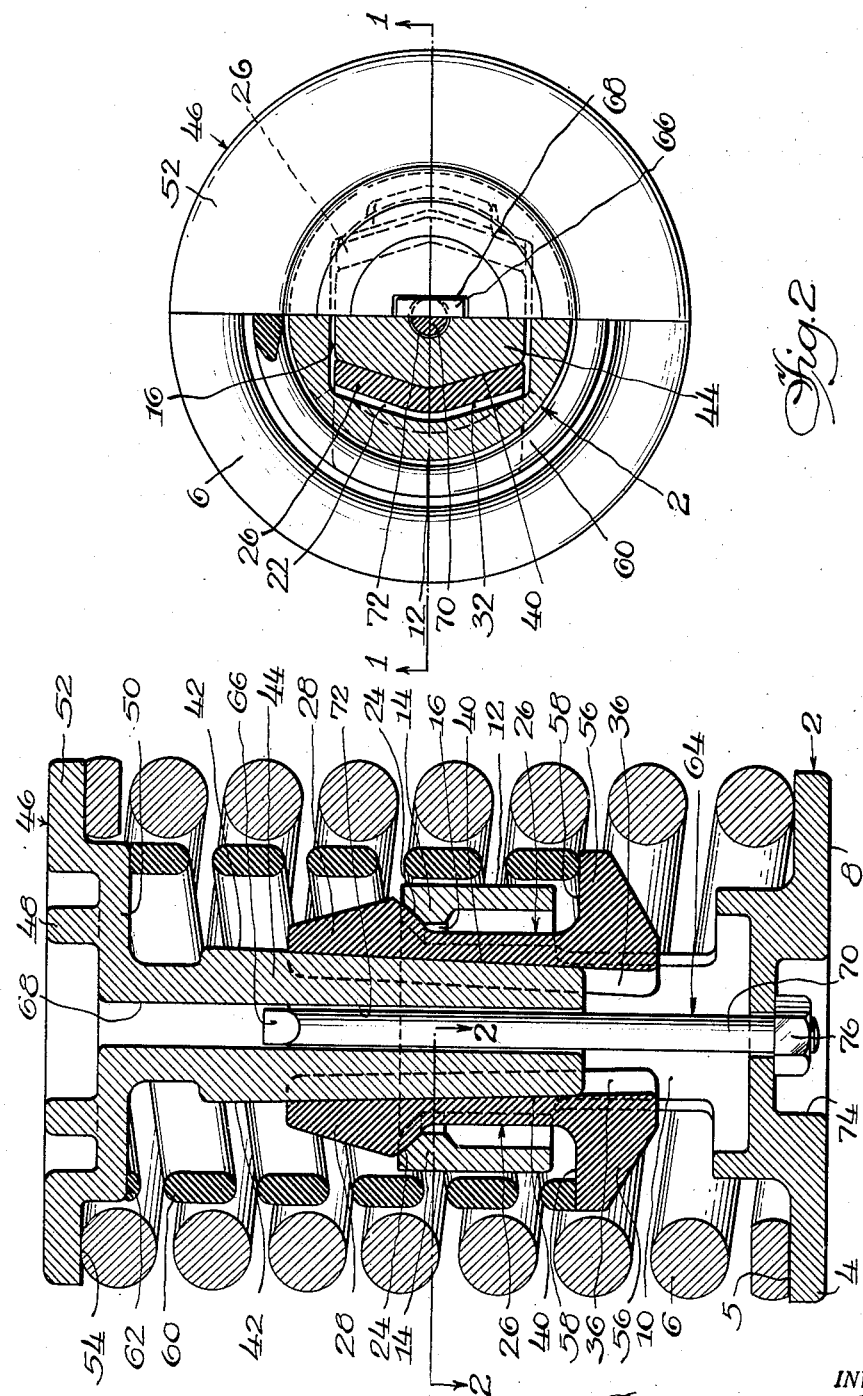
INVENTOR.
David M. Light
BY
Orin O. B. Garner
Atty.

Jan. 10, 1950     D. M. LIGHT     2,494,300
FRICTION DEVICE
Filed June 4, 1945     2 Sheets-Sheet 2
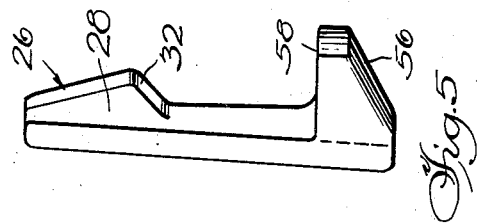
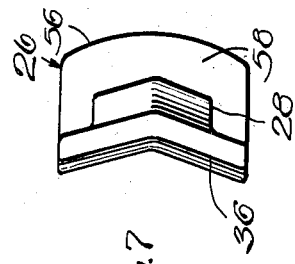
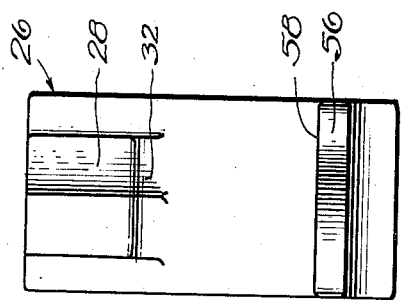
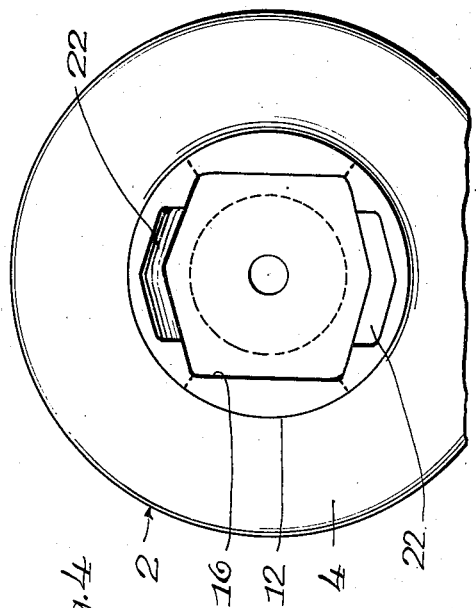
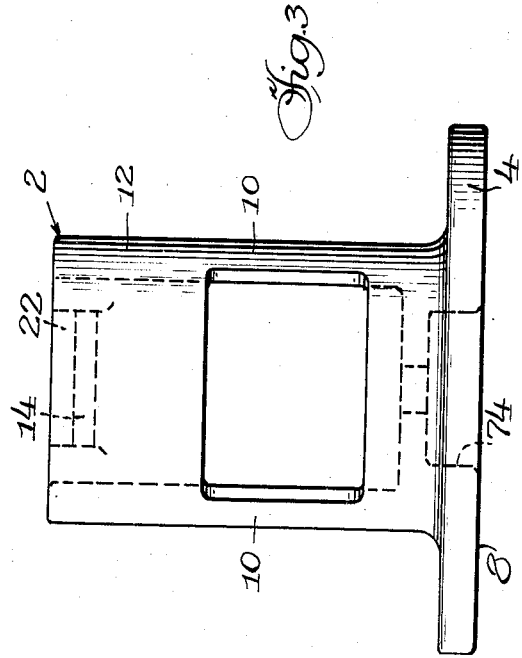
INVENTOR.
David M. Light
BY Patented Jan. 10, 1950

2,494,300

UNITED STATES PATENT OFFICE 2,494,300

FRICTION DEVICE

David M. Light, Chicago, Ill., assignor to American Steel Foundries, Chicago, Ill., a corporation of New Jersey Application June 4, 1945, Serial No. 597,507

18 Claims. (Cl. 267—9)

My invention relates to a friction absorbing device or snubber designed particularly for use on railway car trucks and adapted to replace an ordinary coil spring in a spring group supporting the bolster.

An object of my invention is to devise a friction absorbing device of compact form capable of absorbing an amount of energy sufficient to satisfactorily prevent the harmonic oscillations of the bolster-supporting spring group.

Another object of my invention is to design a friction absorbing device having relatively few parts capable of absorbing a relatively large amount of energy within the small space normally occupied by a single coil spring.

A further object of my invention is to provide a friction absorbing device that is simple in construction, efficient in operation, easily assembled, and composed of relatively few moving parts having large friction areas in engagement with minimum amount of wear of the same.

Other and further objects and advantages of my invention will appear from the following description taken in connection with the accompanying drawings in which:

Figure 1 is a sectional view bisecting a friction absorbing device embodying my invention, the section being taken in the vertical plane substantially indicated by the line 1—1 of Figure 2.

Figure 2 is a top plan view, half in section, the section being taken in the horizontal plane substantially as indicated by the line 2—2 of Figure 1.

Figure 3 is a side elevation of the combined base and shoe carrier structure used in my novel device.

Figure 4 is a top plan view of the structure shown in Figure 3.

Figure 5 is a side elevation of my novel form of friction shoe; Figure 6 is an elevational view taken from the right as seen in Figure 5; and Figure 7 is a top plan view thereof.

In the embodiment of my invention shown in the drawings, my novel device comprises the combination base and shoe carrier generally designated 2 and comprising a base member or annular flange 4 affording a seat as at 5 for one end of the coil spring 6 and a base 8 upon which the device may seat. Projecting upwardly from the base member 4 are the spaced columns 10, 10 merging at their upper ends with a cylindrical support member 12 having spaced ledges 14, 14 at opposite sides thereof and partially defining a hexagonal opening 16 at the upper end of said member 12, said ledges 14, 14 being formed with V-shaped surfaces 22 sloping toward, and upon which may be seated as at 24, similar friction shoes generally designated 26, 26 at opposite sides of the device.

Each of the friction shoes 26, 26 is received within the cylindrical support member 12 and is substantially rectangular in front elevation, as seen in Figure 6, with the upper end of each shoe having formed centrally at one side thereof the lug 28 having at the bottom thereof an inclined V-shaped surface 32, arcuately formed from top to bottom thereof as seen at 24 in Figure 1, in engagement with the surface 22 on the adjacent ledge 14 of the member 12. The opposite side of each friction shoe is formed with a V-shaped sloping friction surface 36, said surfaces 36, 36 having complementary engagement as at 40, 40 with surfaces 42, 42 on opposite sides of the center post 44 of the wedge follower generally designated 46, said follower 46 being provided with a base 48 having a raised portion 50 which is adapted to engage the inner diameter of the spring 6 for positioning the same and having an annular flange 52 against which the end of the spring 6 may be seated as at 54.

The friction shoes 26, 26 project downwardly from their supporting member 12 and between the spaced columns 10, 10, and each shoe is formed at its lower end, beneath the lug 28 thereon, with an outwardly projecting ledge 56, said ledges 56, 56 having upper flat surfaces 58, 58 upon which may be seated one end of the coil spring 60, said spring 60 being sleeved over the cylindrical member 12, the friction shoes 26, 26, and the post 44 of the wedge follower 46 and seated at its upper end against the raised portion 50 on the follower base 48 as at 62.

The device is maintained in assembled relationship by means of a T-shaped bolt generally designated 64 having the head 66 thereof received within a slot 68 formed centrally of the post 44 of the follower 46 and having the shank 70 thereof received within an annular opening 72 in the post 44 and extending between the columns 10, 10 and through an opening in the base member 4 of the follower 2 into an annular recess 74 in said base member 2 accommodating the nut 76 in threaded engagement with the end of the bolt and in abutment with said member 2.

It will be apparent that the bolt and nut assembly will cause the wedge follower 46 and the follower 2 to be urged toward each other compressing the spring 60 between the base 48 of the follower 46 and the ledges 56, 56 on the friction shoes 26, 26 to thereby urge the V-shaped surfaces 32, 32 of the lugs 28, 28 and the surfaces 36, 36 of said shoes into wedge engagement with the surfaces 22, 22 of the support member 12 and into engagement with the surfaces 42, 42 of the post 44 of the follower 46, respectively.

In the operation of the device in service and as the device is placed under load pressure, the post 44 of the wedge follower 46 will be urged downwardly into wedge engagement with the shoes 26, 26 and the latter will be urged outwardly of the post 44 and upwardly of the ledges 14, 14 of the support member 2. This outward movement of the shoes will be simultaneously resisted by the compression of the spring 60 between the base 48 of the follower 46 and the ledges 56, 56 of the shoes 26, 26 whereby the spring will act to urge the shoes and thereby the lugs 28, 28 of the shoes downwardly along the engaged surfaces of the ledges 14, 14 of the support member to maintain the surfaces 36, 36 of the shoes in frictional engagement with the post 44 of the follower 46. Friction is thus developed between the friction surfaces of the shoes in engagement with the post 44 and it may be noted that the engaged surfaces of the shoes and the post afford an extensive area for the development of friction. Upon release of the load, the recoil of the spring 6 and the spring 60 causes the parts to assume their normal position as seen in Figure 1. It will be apparent that the arcuately formed friction surfaces 32 of the shoes in engagement with the V-shaped sloping surfaces 22, 22 of the member 12 as at 24 will permit relative angling movement between the followers 2 and 46 under service conditions without impairing the functioning of the device in the development of friction.

In the assembly of the device, one of the shoes 26 may be inserted within the opening 16 at the top of the spring support member 12 of the follower 2 and positioned with the lug 28 in engagement with one of the ledges 14, 14 of said member, whereupon the other shoe 26 may be inserted in the opening 16 for engagement with the other of the ledges 14, 14. The spring 60 may then be sleeved over the shoes and the support member with the lower end of the spring seated on the ledges 56, 56 of the shoes. The assembly thus far described may have sleeved thereover the spring 6 and the latter is seated at one end thereof on the flange 4 of the follower 2. With the parts thus held in assembly, the post 44 of the follower 46 may be inserted between the shoes 26, 26 and urged downwardly for engaging the upper ends of the springs 6 and 60 with the base 48 of the follower 46. The bolt 64 may then be inserted within the slot 68 and opening 72 of the post 44 and the opening in the base 8 of the follower 2 for engagement with the nut 76.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a friction absorbing device, a bottom follower comprising a base and a hollow shoe carrier and spaced columns extending therebetween and merging therewith, said shoe carrier having spaced sloping V-shaped surfaces at the top thereof, spaced friction shoes extending through said carrier and each comprising a lug projecting outwardly above said carrier and having arcuate faces for engagement with the adjacent surface and a spring support portion projecting outwardly beneath said carrier, a top follower comprising a base and a wedge member depending therefrom between said shoes in wedge engagement therewith, a coil spring sleeved over said carrier and compressed between the base of said top follower and said spring support portions for urging the faces on said lugs on said shoes into wedge engagement with said surfaces and said shoes into wedge engagement with said wedge member, a coil spring seated at opposite ends thereof against the bases on said followers, and a bolt and nut assembly extending through said followers for maintaining said device in assembled relationship.

2. In a friction absorbing device, a bottom follower comprising a base and a hollow shoe carrier and spaced columns extending therebetween and merging therewith, said shoe carrier having spaced wedge surfaces at the top thereof, spaced friction shoes extending through said carrier and each comprising a wedge portion projecting above said carrier in engagement with the adjacent surface and a spring support portion projecting outwardly beneath said carrier, a top follower comprising a base and a wedge member depending therefrom between said shoes and having spaced sloping V-shaped faces, a coil spring sleeved over said carrier and compressed between the base of said top follower and said spring support portions for urging said wedge portions into engagement with said wedge surfaces and said shoes into complementary engagement with said faces, a coil spring seated at opposite ends thereof against said bases, and rigid means extending through said followers for maintaining said device in assembled relationship.

3. In a friction absorbing device, a bottom follower comprising a base and a hollow shoe carrier and spaced columns extending therebetween and merging therewith, said shoe carrier having spaced sloping V-shaped surfaces at the top thereof, spaced friction shoes extending through said carrier and each comprising a lug projecting outwardly above said carrier and having arcuate faces for engagement with the adjacent surface and a spring support portion projecting outwardly beneath said carrier, a top follower comprising a base and a wedge member depending therefrom between said shoes in wedge engagement therewith, a coil spring sleeved over said carrier and compressed between the base of said top follower and said spring support portions for urging the lugs on said shoes into wedge engagement with said surfaces and said shoes into wedge engagement with said wedge member, and a coil spring seated at opposite ends thereof against the bases on said followers.

4. In a friction absorbing device, a bottom follower comprising a base and a hollow shoe carrier and spaced columns extending therebetween and merging therewith, said shoe carrier having spaced wedge surfaces at the top thereof, spaced friction shoes extending through said carrier and each comprising a wedge portion projecting above said carrier in engagement with the adjacent surface and a spring support portion projecting outwardly beneath said carrier, a top follower comprising a base and a wedge member depending therefrom having spaced sloping V-shaped faces, a coil spring sleeved over said carrier and compressed between the base of said top follower and said spring support portions for urging said wedge portions into engagement with said wedge surfaces and said shoes into complementary engagement with said faces, and a coil spring seated at opposite ends thereof against said bases.

5. In a friction absorbing device, a follower comprising a base and a hollow shoe carrier spaced therefrom and connected thereto, spaced friction shoes extending through said carrier and each comprising at one side thereof a wedge portion in wedge engagement with said carrier at one end thereof and a spring support portion extending outwardly of said carrier at the opposite end thereof, a sloping V-shaped surface on each shoe at the opposite side thereof, a follower comprising a base and having a wedge post extending between said shoes in complementary engagement with said surfaces, resilient means sleeved over said carrier and compressed between said spring support portions and the base of said last-mentioned follower, a coil spring extending between said bases and seated thereagainst, and rigid means connecting said followers for maintaining said device in assembled relationship.

6. In a friction absorbing device, a follower comprising a base and a hollow shoe carrier spaced therefrom and connected thereto, spaced wedge surfaces on said carrier at the upper end thereof, spaced friction shoes extending through said carrier and each comprising a wedge portion in engagement with an adjacent surface and a spring support portion extending outwardly beneath said carrier, a follower comprising a base and a wedge member depending therefrom between said shoes in wedge engagement therewith, resilient means sleeved over said carrier and compressed between the base of said last-mentioned follower and said spring support portions, a coil spring extending between said bases and seated thereagainst, and rigid means connecting said followers for maintaining said device in assembled relationship.

7. In a friction absorbing device, a follower comprising a base and a hollow shoe carrier spaced therefrom and connected thereto, spaced friction shoes extending through said carrier and each comprising at one side thereof a wedge portion in wedge engagement with said carrier at one end thereof and a spring support portion extending outwardly of said carrier at the opposite end thereof, a sloping V-shaped surface on each shoe at the opposite side thereof, a follower comprising a base and having a wedge post extending between said shoes in complementary engagement with said surfaces, resilient means sleeved over said carrier and compressed between said spring support portions and the base of said last-mentioned follower, and a coil spring extending between said bases and seated thereagainst.

8. In a friction absorbing device, a follower comprising a base and a hollow shoe carrier spaced therefrom and connected thereto, spaced wedge surfaces on said carrier at the upper end thereof, spaced friction shoes extending through said carrier and each comprising a wedge portion in engagement with an adjacent surface and a spring support portion extending outwardly beneath said carrier, a follower comprising a base and a wedge member depending therefrom between said shoes in wedge engagement therewith, resilient means sleeved over said carrier and compressed between the base of said last-mentioned follower and said spring support portions, and a coil spring extending between said base and seated thereagainst.

9. In a friction absorbing device, a follower comprising a base and a hollow shoe carrier spaced therefrom and connected thereto, spaced friction shoes extending through said carrier and each comprising at one side thereof a wedge portion in wedge engagement with said carrier at one end thereof and a spring support portion extending outwardly of said carrier at the opposite end thereof, a sloping V-shaped surface on each shoe at the opposite side thereof, a follower comprising a base and having a wedge post extending between said shoes in complementary engagement with said surfaces, and resilient means sleeved over said carrier and compressed between said spring support portions and the base of said last-mentioned follower.

10. In a snubber, a follower comprising a base, spaced columns extending in adjacent relationship from said base, a shoe carrier connected to the ends of said columns remote from said base, spaced shoes extending through said carrier and in wedge engagement with said carrier at the extremity thereof remote from said columns, each shoe having a spring seat portion extending outwardly of said carrier around the extremity thereof adjacent said columns through an opening defined between said columns, a follower comprising a base and a friction member extending therefrom between said shoes, resilient means surrounding said carrier and compressed between the base of said last-mentioned follower and the spring seat portions of said shoes, and resilient means reacting between said bases.

11. In a friction absorbing device, a follower comprising a base and a hollow wedge member, spaced friction shoes extending through said member and each comprising at one side thereof a wedge portion in wedge engagement with said member at one end thereof and a spring seat portion extending outwardly from said member at the opposite end thereof, a follower providing a base and having a wedge post extending between said shoes in wedge engagement therewith, resilient means sleeved over said member and compressed between said spring seat portions and the base of said last-mentioned follower, and a coil spring seated at opposite ends thereof against said bases.

12. In a snubber, a follower comprising an integral tubular member presenting internal spaced wedge surfaces, spaced shoes extending within said member and having wedge engagement with said surfaces, each of said shoes having a spring seat extending outwardly of said member through openings therein spaced from said surfaces, a follower having a wedge post extending between said shoes in wedge engagement therewith, said spring seats being remote from the follower having a wedge post, resilient means compressed between said spring seats and said last-mentioned follower, a coil spring bearing against abutment means on said followers, and rigid means extending through said followers and connecting the same for maintaining said snubber in assembled relationship.

13. In a snubber, a follower comprising a tubular member presenting internal spaced wedge surfaces, spaced shoes extending within said member and having wedge engagement with said surfaces, each of said shoes having a spring seat extending outwardly of said member through openings therein axially spaced from said wedge surfaces, a follower having a wedge post extending between said shoes in wedge engagement therewith, said spring seats being remote from the follower having a wedge post, resilient means compressed between said spring seats and said last-mentioned follower, and a coil spring bearing against abutment means on said followers.

14. In a snubber, a follower comprising a tubular member, spaced friction shoes supported within said member and having wedge engagement adjacent one end thereof with said member, a spring seat on each shoe at the opposite end thereof, a follower comprising a wedge post extending between said shoes and having diagonal face engagement therewith, resilient means sleeved over said member and compressed between said spring seats and said last-mentioned follower, and a coil spring bearing against abutment means on said followers.

15. In a snubber, a top follower comprising a friction post, spaced friction shoes disposed on opposite sides of said post in frictional engagement therewith, a bottom follower comprising a member surrounding said post and shoes and having wedge engagement with said shoes, resilient means compressed between said top follower and portions of said shoes remote from said top follower, and a coil spring bearing at opposite ends thereof against abutment means on said top and bottom followers.

16. In a snubber, a top follower comprising a friction post, a bottom follower having a base member and comprising a wedge member surrounding said post, spaced friction shoes disposed between said post and said wedge member in wedge engagement with said wedge member and in frictional engagement with said post, resilient means compressed between said top follower and portions of said shoes adjacent said base member, and a coil spring bearing at opposite ends thereof against said followers.

17. In a snubber, a pair of followers, one of said followers comprising a post, the other of said followers comprising a hollow member receiving said post therewithin, friction shoes extending through said member and in wedge engagement therewith along areas adjacent said one follower and in frictional engagement with said post, each shoe having a spring seat portion at an end remote from said one follower and extending outwardly of said member, and resilient means reacting between said spring seat portions and said one follower.

18. In a friction absorbing device, a follower comprising a base and a hollow wedge member, spaced friction shoes extending through said member and each comprising at one side thereof a wedge portion in wedge engagement with said member at one end thereof and an outturned spring seat lug extending outwardly from said member at the opposite end thereof, a follower comprising a base and having a wedge post extending between said shoes in wedge engagement therewith, resilient means sleeved over said member and compressed between said spring seat lugs and the base of said last-mentioned follower, said spring, upon compression of said device, exerting a force tending to pull said shoes through said member and urging said shoes into said engagements, and a coil spring seated at opposite ends thereof against said bases.

DAVID M. LIGHT.

REFERENCES CITED

The following references are of record in the file of this patent:

UNITED STATES PATENTS

| Number | Name | Date |
| --- | --- | --- |
| 992,442 | O'Connor | May 16, 1911 |
| 1,302,076 | O'Connor | Apr. 29, 1919 |
| 1,329,795 | O'Connor | Feb. 3, 1920 |
| 1,555,696 | O'Connor | Sept. 29, 1925 |
| 1,688,649 | O'Connor | Oct. 23, 1928 |
| 1,698,727 | Miner | Jan. 15, 1929 |
| 1,907,068 | Haseltine | May 2, 1933 |
| 2,223,656 | Bachman | Dec. 3, 1940 |
| 2,375,897 | Dath | May 15, 1945 |
| 2,382,563 | Haseltine | Aug. 14, 1945 |
| 2,392,977 | Dath | Jan. 15, 1946 |